United States Patent [19]

Panuski

[11] Patent Number: 4,860,491
[45] Date of Patent: Aug. 29, 1989

[54] POTTER'S GRATE

[76] Inventor: William R. Panuski, 5 Ocean Ave., Magnolia, Mass. 01930

[21] Appl. No.: 135,062

[22] Filed: Dec. 18, 1987

[51] Int. Cl.⁴ .............................................. A01G 9/02
[52] U.S. Cl. ........................................... 47/66; 47/71; 47/79
[58] Field of Search ................... 47/64, 66, 71, 78, 79, 47/80; 4/650, 651, 652

[56] References Cited

U.S. PATENT DOCUMENTS 611,523   9/1898   Springer .................................. 47/66

FOREIGN PATENT DOCUMENTS 2139464   11/1984   United Kingdom .................... 47/66

Primary Examiner—Lynda M. Cofsky
Attorney, Agent, or Firm—Donald N. Halgren

[57] ABSTRACT

A grate for deposition in a hole in a bottom of a ceramic, clay planter pot or miscellaneous flat bottom containers to facilitate drainage and minimize erosion of soil in the container. The grate comprises a flat, resilient plastic disc having a flat upper surface and a flat lower surface. A plurality of arcuate openings are disposed through the disc. A plurality of standoffs are arranged on the flat bottom surface of the disc. There are stepped pie shaped elements which permit insertion of those elements into different sized holes in planter's pots and containers.

7 Claims, 1 Drawing Sheet

U.S. Patent    Aug. 29, 1989    4,860,491
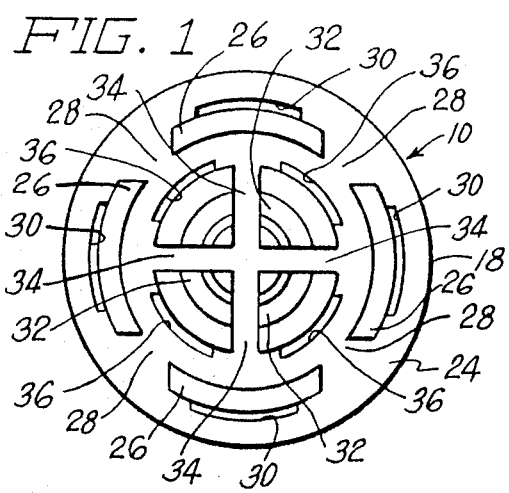
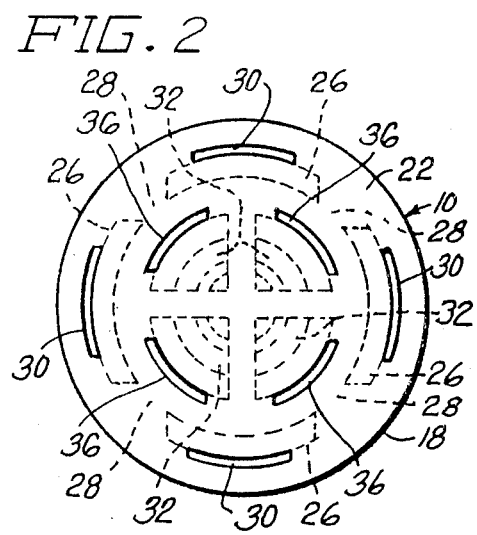
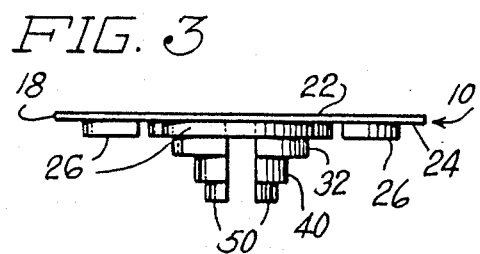
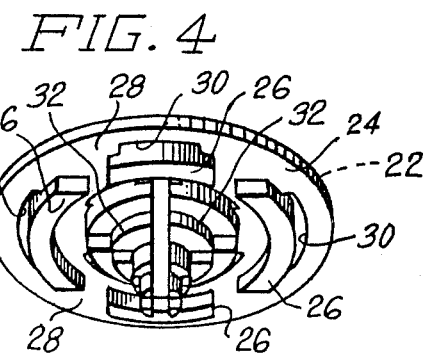
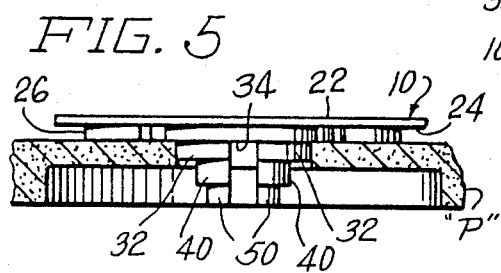
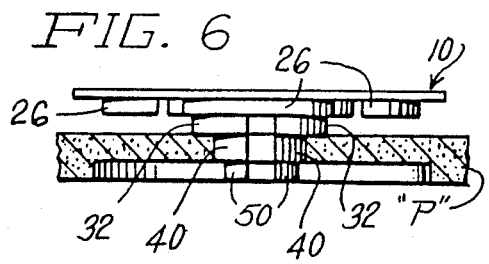
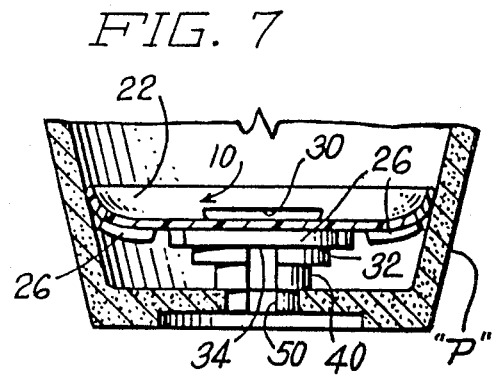

POTTER'S GRATE

BACKGROUND OF THE INVENTION (1) Field of the Invention

This invention relates generally to horticulture, and more particularly to drainage devices utilized in flat bottomed ceramic planter pots and potting containers.

(2) Prior Art

Potter container drainage has for years presented a challenge to professional and amateur gardeners alike. What is the best solution for providing drainage and covering the drainage hole? If it is covered too tightly, you defeat the purpose of the drainage hole. If it is covered too loosely, the soil in the pot will erode away.

The horticulturist's traditional solution to the drainage hole cover problem is to smash a clay pot and utilize the resulting shards to cover the drainage holes in the various size pots available. Other devices used by horticulturists to cover ceramic/clay container drainage holes have included sponges or screens, cut to the proper size for the bottom of the container.

They all fail to provide the ventilation and the drainage needed. Often they shift from the appropriate position directly over the hole in the bottom of the pot.

It is an object of the present invention to provide a grate for a potting type container that is inexpensive to make and buy.

It is a further object of the present invention to provide a single grate for a ceramic or clay pot that will cover any hole in commercially made ceramic or clay pots.

It is yet a further object of the present invention to provide a grate which prevents soil erosion, while permitting ventilation thereof.

BRIEF SUMMARY OF THE INVENTION

The present invention comprises a grate for ceramic or clay pots which is adaptable to any of the standard size holes in common pots or planter containers.

The grate comprises a disc shaped upper portion having a generally flat upper surface and a flat lower surface thereon. A plurality of arcuate standoffs extend downwardly from the lower surface of the disc. The arcuate standoffs are disposed at a common radius from the center of the disc. There are four such arcuate standoffs in the preferred embodiment for proper weight distribution of the soil to be disposed thereabove, once the grate has been arranged in a hole in the bottom of the container.

An arcuate opening is arranged through the disc, outwardly of and radially adjacent each of the standoffs. A plurality of pie shaped elements, spaced from one another by radially directed gaps arranged therebetween, are disposed about the center of the lower surface of the disc. Each pie shaped element is of about the same thickness as the arcuate standoffs.

Each pie shaped element has an arcuate opening disposed through the disc just radially outwardly therefrom. Each pie shaped element has a second pie shaped element disposed thereon, the radial corners of each, being in alignment. Each second pie shaped element, though smaller in the radial direction than the pie shaped element it is disposed on, effects a stepped arrangement therewith.

A projection extends from the corner of each pie shaped element. Each projection is stepped with at least one smaller radially inward portion. The radially directed gaps extend between the pie shaped segments and their respective projections and are arranged so as to intersect the arcuate standoffs.

The circumferential spaces between adjacent arcuate standoffs act as a channel. The radially directed gaps act as channels from their intersection at the center of the lower surface of the disc and are in communication with the circumferential spaces between the standoffs, as well as in communication with the arcuate openings disposed through the disc.

The channels provide space for drainage of water in the pots when the grate, with its projections, extend into the hole in the bottom thereof.

The stepped configuration of each projection and the fact that the grate is made from resilient plastic, which permits slight deformation, enables the grate to be inserted into small holes in small pots or mate with larger holes in larger pots. The stepped configuration of the pie shaped members permits snug mating with the holes when the pots and their drain holes are of intermediate size.

BRIEF DESCRIPTION OF THE DRAWINGS

The objects and advantages of the present invention will become more apparent when viewed in conjunction with the following drawings, in which:

FIG. 1 is a bottom view of a pot grate constructed according to the present invention;

FIG. 2 is a top view of a pot grate;

FIG. 3 is a side view of a grate;

FIG. 4 is a perspective view of the bottom of a grate;

FIG. 5 is a side elevational view of a grate in a large diameter drain hole in a large size clay pot;

FIG. 6 is a side elevational view of a grate in an intermediate diameter drainhole in an intermediate size clay pot; and FIG. 7 is a side elevational view of a grate in a small diameter drain hole in a small size clay pot.

DESCRIPTION OF THE PREFERRED EMBODIMENT

Referring to the drawings in detail, and particularly to FIG. 1, there is shown a bottom of a grate 10 which is disposable against the bottom of a clay pot.

The grate 10 comprises a disc 18 having a generally flat upper surface 22 and a lower surface 24 thereon. A plurality of arcuate standoffs 26 extend downwardly from the lower surface 24 of the disc 18. The standoffs 26 are disposed on the disc 18 around a common radius from the center of the disc. In the preferred embodiment, there are four such standoffs 26, with an arcuate space 28 arranged therebetween.

An arcuate opening 30 is disposed through the disc 18, radially outwardly of and adjacent each of the standoffs 26. A plurality of first pie shaped elements 32, separated from one another by radially directed gaps 34 arranged therebetween, are disposed each on a pie shaped base, as shown in FIG. 4 about the center of the lower surface 24 of the disc 18. Each first pie shaped element 32 is generally about the same thickness as the standoffs 26.

Each first pie shaped element 32, shown from their opposite side, in FIG. 2, has an arcuate opening 36, disposed through the disc 18, just radially outwardly therefrom. Each first pie shaped element 32 has a second pie shaped element 40 superimposed thereon, of a similar thickness, but of smaller radially dimension, as can be seen in FIGS. 3–7, providing a step-like characteristic between the lower surface 24 and the first and second tiers of pie shaped elements 32 and 40, respectively.

A stepped projection 50 extends downwardly from the radially innermost corner of each pie shaped element combination 32 and 40. The radially directed gaps 34 separate the projections 50 as well as their pie shaped elements 32 and 40.

The various steps on the projections 50, the pie shaped elements 32 and 40 provide the engaging means for the grate 10 to snugly mate with any of a variety of standard size holes found in a variety of pot sizes.

FIG. 5 shows part of a pot "p" with a larger hole in which the first tier pie shaped elements 32 mate. FIG. 6 shows part of a pot with an intermediate size hole in the bottom thereof, with the second tier pie shaped elements 40 extending therein, the elements 32 resting on the bottom surface of the pot "p".

The grate 10 itself is molded from a flexible resilient plastic such as polyethylene, polyprophylene or the like and permits it to deform so as to match the peculiarities of any pot or its drain hole. The disc 18 is thin enough radially outwardly of the standoffs 26, so as to be able to bend upwardly in conformance to a pot, should the grate 10 be placed in a pot "p" having a bottom smaller than the diameter of the grate 10, as that shown in FIG. 7.

The gaps 34 between the projections 50 and the pie shaped elements 32 and 40 provide a channel for the flow of air and the drainage of water. The arcuate space between the standoffs 26, which are not in radial alignment with the gaps, permit a serpentine path for the channeling of air and water therewithin. The openings in the disc 18 also provides fluid communication from the upper surface of the disc 18 with the channels on the lower side of the disc 18.

Thus, there has been shown a grate for use by potters which is adaptable to any size clay, ceramic planter pots, or miscellaneous flat bottom planter containers having a wide variety of drain holes, which grate permits ventilation and drainage while maintaining proper soil support. The serpentine configuration of the channels prevents erosion, and the placement of the openings through the disc facilitates the ventilation.

I claim:

1. A molded grate for disposition in a hole in the bottom of a planter's pot to facilitate drainage and minimize erosion with respect to soil placed over said grate in a pot, said grate comprising:
   a flat resilient molded plastic disc shaped element having an upper surface and a lower surface,
   a plurality of openings disposed through said disc;
   a plurality of standoffs disposed on the lower surface of said disc, said standoffs having spaces therebetween to define first channels for drainage and ventilation;
   said first channels and said openings being in fluid communication;
   an arrangement of first pie shaped elements radially disposed against the lower surface of said disc;
   an arrangement of several successive pie-shaped elements disposed on each of said first pie-shaped elements, to define a stepped configuration in which the radii of the successive pie-shaped elements decrease in a direction away from the lower surface of said disc.

2. A grate for a planter's pot as recited in claim 1, including a projection extending from the radially innermost corners of said stepped pie shaped elements.

3. A grate for a planter's pot as recited in claim 2, wherein a plurality of radially directed channels are disposed between adjacent stepped pie-shaped elements.

4. A grate for a planter's pot as recited in claim 3, wherein said radially directed channels are in fluid communication with said first channels.

5. A grate for a planter's pot as recited in claim 1, wherein said openings through said disc are arcuately shaped so as to provide full support circumferentially for said disc.

6. A molded plastic grate for an opening in a pot to retain soil therein and facilitate water drainage thereform, comprising:
   a flat bendable disc member having an upper and a lower side;
   an arrangement of standoffs disposed on the lower side of said disc member;
   a plurality of openings disposed through said disc member, said openings and said standoffs defining passageways for the passage of water and air therethrough while said disc properly retains the soil in the pot;
   said passageway being disposed between said pot and said disc; and
   an arrangement of pie-shaped elements having an outer edge and a stepped configuration of increasing thickness from their outer edge inwardly.

7. A grate as recited in claim 6, wherein said pie shaped elements have radially directed spaces therebetween to act as passageways in conjunction with said standoffs.

* * * * *